(12) United States Patent
Dinha et al.

(10) Patent No.: US 10,225,105 B2
(45) Date of Patent: Mar. 5, 2019

(54) NETWORK ADDRESS TRANSLATION

(71) Applicant: OpenVPN Technologies, Inc., Pleasanton, CA (US)

(72) Inventors: Francis Dinha, Dublin, CA (US); James Yonan, Pleasanton, CA (US)

(73) Assignee: OpenVPN Technologies, Inc., Pleasanton, CA (US)

( * ) Notice: Subject to any disclaimer, the term of this patent is extended or adjusted under 35 U.S.C. 154(b) by 209 days.

(21) Appl. No.: 15/204,904

(22) Filed: Jul. 7, 2016

(65) Prior Publication Data

US 2017/0012937 A1 Jan. 12, 2017

Related U.S. Application Data

(60) Provisional application No. 62/190,236, filed on Jul. 8, 2015.

(51) Int. Cl.
*H04L 12/46* (2006.01)
*H04L 29/12* (2006.01)
*H04L 12/741* (2013.01)

(52) U.S. Cl.
CPC ...... *H04L 12/4641* (2013.01); *H04L 12/4633* (2013.01); *H04L 61/2514* (2013.01); *H04L 61/2592* (2013.01); *H04L 45/74* (2013.01)

(58) Field of Classification Search
CPC . H04L 12/4633; H04L 12/4641; H04L 45/74; H04L 61/2514; H04L 61/2592; H04L 5/74–5/748
See application file for complete search history.

(56) References Cited

U.S. PATENT DOCUMENTS

| | | | | |
|---|---|---|---|---|
| 6,101,552 A * | 8/2000 | Chiang | ............ | H04L 29/12009 709/203 |
| 6,381,638 B1 * | 4/2002 | Mahler | ............ | H04L 29/12009 370/355 |
| 6,434,627 B1 * | 8/2002 | Millet | ............... | H04L 29/12009 370/392 |
| 6,937,574 B1 | 8/2005 | Delaney et al. | | |
| 7,219,161 B1 * | 5/2007 | Fagundo | .......... | H04L 29/12367 709/229 |
| 2001/0052029 A1 * | 12/2001 | Harbin | ............. | H04L 29/12009 709/251 |
| 2002/0032798 A1 * | 3/2002 | Xu | ......................... | H04L 29/06 709/238 |

(Continued)

*Primary Examiner* — Dung B Huynh
(74) *Attorney, Agent, or Firm* — Antero, Tormey & Petrin, P.C.; Peter Tormey

(57) ABSTRACT

A method including receiving, at a virtual private network (VPN) server, an encapsulated packet on one of the ingress addresses wherein the ingress address is associated with the packet information. After processing the packet at the VPN server, the packet source address is transformed to the address of the ingress port before transmitting the packet over a network. The process may be effectuated in the operating system's kernel. The association step may include tracking the ingress port in a data store, or tagging the packet with the ingress address so it can be later used to modify the source address. Transforming may include swapping TCP source and destination port information, changing an IP or TCP header checksum, changing a TCP sequence and acknowledgment number, or changing an IP addresses contained in the data payload.

10 Claims, 1 Drawing Sheet

(56) References Cited

U.S. PATENT DOCUMENTS

| Publication No. | Date | Inventor | Classification | Subclass |
|---|---|---|---|---|
| 2002/0067726 A1* | 6/2002 | Ganesh | H04L 29/06 | 370/392 |
| 2002/0141352 A1* | 10/2002 | Fangman | H04L 29/06027 | 370/254 |
| 2003/0007486 A1* | 1/2003 | March | H04L 29/06027 | 370/389 |
| 2003/0169766 A1* | 9/2003 | Ogawa | H04L 29/12066 | 370/466 |
| 2004/0044778 A1* | 3/2004 | Alkhatib | H04L 29/12509 | 709/228 |
| 2004/0066780 A1* | 4/2004 | Shankar | H04L 12/4645 | 370/389 |
| 2005/0086289 A1* | 4/2005 | Rosenberg | H04L 29/06027 | 709/201 |
| 2005/0117605 A1* | 6/2005 | Yan | H04L 29/06027 | 370/469 |
| 2005/0136924 A1* | 6/2005 | Adrangi | H04L 29/12009 | 455/435.1 |
| 2005/0204060 A1* | 9/2005 | Maekawa | H04L 29/12528 | 709/245 |
| 2005/0265354 A1* | 12/2005 | Ryu | H04L 29/12009 | 370/395.52 |
| 2006/0192997 A1* | 8/2006 | Matsumoto | G06F 3/1204 | 358/1.15 |
| 2007/0147263 A1* | 6/2007 | Liao | H04L 29/06027 | 370/252 |
| 2008/0181243 A1* | 7/2008 | Vobbilisetty | H04L 45/00 | 370/406 |
| 2008/0259943 A1* | 10/2008 | Miyajima | H04L 29/12528 | 370/401 |
| 2010/0208734 A1* | 8/2010 | Shiba | H04L 29/12405 | 370/392 |
| 2011/0292206 A1* | 12/2011 | Newton | H04L 12/4641 | 348/143 |
| 2013/0044636 A1* | 2/2013 | Koponen | H04L 47/12 | 370/254 |
| 2013/0308637 A1* | 11/2013 | Han | H04L 12/4633 | 370/390 |
| 2014/0294010 A1* | 10/2014 | Biswas | H04L 45/245 | 370/392 |
| 2015/0281408 A1* | 10/2015 | Kwan | H04L 69/22 | 370/474 |
| 2016/0006655 A1* | 1/2016 | Hyoudou | H04L 12/54 | 370/392 |
| 2016/0020922 A1* | 1/2016 | Sung | H04W 28/08 | 370/329 |
| 2016/0142291 A1* | 5/2016 | Polland | H04L 45/36 | 370/392 |
| 2016/0261498 A1* | 9/2016 | Eastlake, III | H04L 45/74 | |
| 2016/0330167 A1* | 11/2016 | Cai | H04L 61/103 | |
| 2016/0352538 A1* | 12/2016 | Chiu | H04L 12/6418 | |

* cited by examiner

NETWORK ADDRESS TRANSLATION

PRIORITY

This application claims the benefit of provisional patent application 62/190,236 entitled NETWORK ADDRESS TRANSLATION, filed Jul. 8, 2015 by the same inventors, which is incorporated, together with its appendix, by reference as if fully set forth herein.

BACKGROUND

Conventionally virtual private network (VPN) service providers publish a large number of public IP addresses for clients to reach their services. For purposes of this disclosure, these addresses are known as "ingress" addresses because they are used as entry points into the service. Using a large number of ingress addresses is generally necessary for several reasons because ingress addresses may be blocked by Internet service providers (ISPs) or even sovereign nations to prevent users from accessing VPN services. Moreover, web-scale VPN services typically require a large, geographically decentralized infrastructure that is supported by thousands of individual server nodes. Distributing clients among numerous ingress addresses is necessary to effectively scale the service.

When a VPN client accesses an external web site, the VPN server performs a network address translation (NAT) on the packets to transform the source address of the packet to an "egress" address, (i.e. the address of the VPN server node). Accordingly, the web site visited by the VPN client will "see" the client's IP address as being that of the VPN server (the egress address)—the real IP address of the client is hidden from the web site.

VPN service providers must also host a large number of egress addresses because many web sites will not operate correctly if too many users from the same egress address attempt to concurrently access the site. In addition, some web sites actively discriminate against VPN users by attempting to block access from known VPN egress addresses. This requires large VPN service providers to supply hundred or thousands of VPN server nodes to handle potentially millions of concurrent client connections. VPN service networks operate most efficiently when each individual server node "owns" its own set of egress addresses.

Another reason to have a large supply of egress addresses is to combat distributed denial-of-service attacks (DDoS). To prevent these attacks from degrading network-wide service quality, it is necessary to immediately remove an attacked egress attack from the network, replacing it with a new address.

SUMMARY

Disclosed herein is a method including receiving, at a virtual private network (VPN) server, an encapsulated packet on one of the ingress addresses wherein the ingress address is associated with the packet information. After processing the packet at the VPN server, the packet source address is transformed to the address of the ingress port before transmitting the packet over a network. The process may be effectuated in the operating system's kernel. The association step may include tracking the ingress port in a data store, or tagging the packet with the ingress address so it can be later used to modify the source address. Transforming may include swapping TCP source and destination port information, changing an IP or TCP header checksum, changing a TCP sequence and acknowledgment number, or changing an IP addresses contained in the data payload.

DESCRIPTION

Generality of Invention

Figure 1:
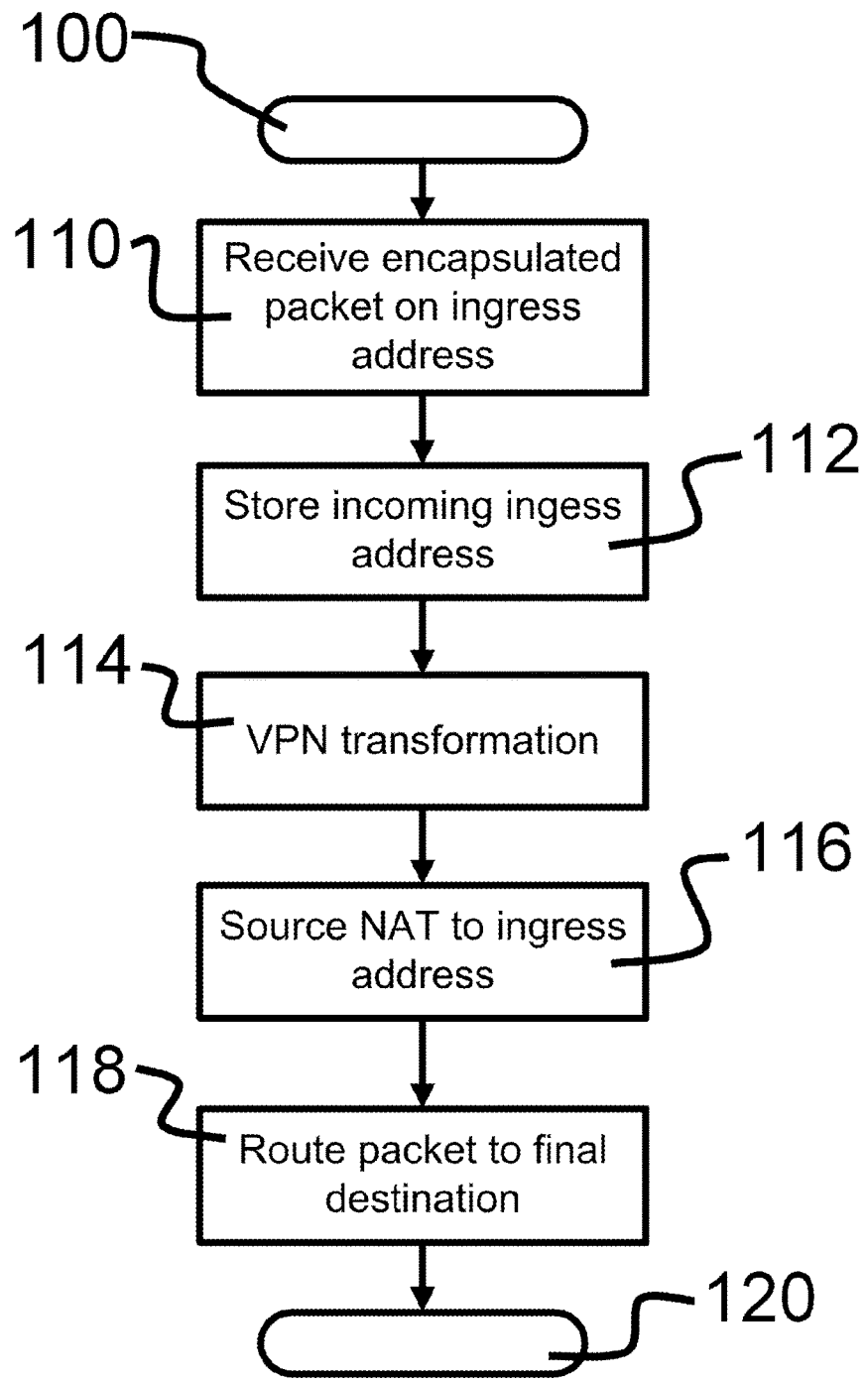
FIG. 1 shows a flow chart for certain embodiments according to the current disclosure.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Certain embodiments may be effectuated using the information in the attached Technical Appendix which, together with its associated FIGURE, is incorporated by reference as if fully set forth herein.

The construction and method of operation of the invention, however, together with additional objectives and advantages thereof will be best understood from the following description of specific embodiments when read in connection with the accompanying drawings.

Lexicography

The terms "data payload" or "payload" generally refer to information in a data packet that is not conventionally in the header or footer and does not conventionally pertain to routing information for the packet. Payload information may be encrypted.

The terms "effect", "with the effect of" (and similar terms and phrases) generally indicate any consequence, whether assured, probable, or merely possible, of a stated arrangement, cause, method, or technique, without any implication that an effect or a connection between cause and effect are intentional or purposive.

The terms "header" and footer" generally refer to parts of a data packet that include control information such as routing, VPN information, sender information, routing information, protocol information, and the like.

The term "relatively" (and similar terms and phrases) generally indicates any relationship in which a comparison is possible, including without limitation "relatively less", "relatively more", and the like. In the context of the invention, where a measure or value is indicated to have a relationship "relatively", that relationship need not be precise, need not be well-defined, need not be by comparison with any particular or specific other measure or value. For example, and without limitation, in cases in which a measure or value is "relatively increased" or "relatively more", that comparison need not be with respect to any known measure or value, but might be with respect to a measure or value held by that measurement or value at another place or time.

The term "substantially" (and similar terms and phrases) generally indicates any case or circumstance in which a determination, measure, value, or otherwise, is equal, equivalent, nearly equal, nearly equivalent, or approximately, what the measure or value is recited. The terms "substantially all" and "substantially none" (and similar terms and phrases) generally indicate any case or circumstance in which all but a relatively minor amount or number (for "substantially all") or none but a relatively minor amount or number (for "substantially none") have the stated property. The terms "substantial effect" (and similar terms and phrases) generally indicate any case or circumstance in which an effect might be detected or determined.

The terms "this application", "this description" (and similar terms and phrases) generally indicate any material shown or suggested by any portions of this application, individually or collectively, and include all reasonable conclusions that might be drawn by those skilled in the art when this application is reviewed, even if those conclusions would not have been apparent at the time this application is originally filed.

Detailed Description

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

System Elements

Certain embodiments may be effectuated using the information in the attached appendix which is incorporated by reference as if fully set forth herein.

An objective of the current disclosure is to facilitate managing ingress and egress addresses by a large VPN service provider by eliminating the need to maintain ingress and egress addresses separately and to facilitate tying together an egress with an ingress address for compliance purposes.

FIG. 1 shows a flow chart for certain embodiments according to the current disclosure.

The method in FIG. 1 begins at a flow label 100.

At a step 110 a processing device, such as a VPN server, receives an encapsulated packet on an ingress address.

At a step 112, the ingress address is associated with the packet and recorded in a structured data source such as a database, lookup table, XML file, and the like.

At a step 114, VPN transformations take place. These VPN transformations may include decryption, and other processing techniques.

At a step 116, the transformed packet is source translated to a new network address using the ingress address as the source (i.e. network address translation, NAT).

At a step 118, the packet is routed to its final destination.

At a flow label 120 the method ends.

The process described herein of network address translation using the ingress address as an egress address ("IENAT") works by tracking the ingress address that each VPN client enters the network by, and uses this as the egress address for the client's outgoing interaction with the greater internet. In certain embodiments a modification to the VPN server network stack may be employed to track the ingress address as packets move through the stack and through the various VPN transformation layers. When the NAT stage is reached in the stack, prior to sending decrypted client packets to their target hosts, the packet is source-NATed to the original ingress address.

Conventional stack implementations may include a fundamental object that represents a packet as it moves through the stack. For example, on Linux, this object may be called an "sk_buff". The packet object typically contains information about the packet such as protocol type, source address, destination address, and raw packet data. This packet may be modified to also include the ingress address of the packet. When an incoming network packet is received, the packet object may be tagged with the Ingress Address (for example and without limitation, the local IP address and port number of the interface on which the packet was received). As the packet moves through the network stack, the ingress address accompanies it.

A network stack may contain packets moving through different layers, some of which may transform the packet:

Routing layers may direct the packet to specific interfaces.
  Filter layers (such as Linux netfilter) may drop, modify, or perform NAT transformations on the packet.
  VPN layers may encapsulate/decapsulate packets within an encrypted envelope.

Because the packet object is tagged with the ingress address, each of these transformation layers retains the stored ingress address as the packet moves through the stack. Further, the ingress address may be visible to the transformation layers themselves, each of which can potentially use the address as part of their functionality.

Conventionally, a VPN service provider will enable "Source NAT" on outgoing IP packets that originate from customer VPN connections. This is so that a VPN customer's packets will be modified so as to have a source address marked as originating from the public IP address of the VPN server. This address transformation is necessary so that the return packets of the customer's interactions from the Internet will find their way back to the VPN server to be securely tunneled to a user's computer or device that is running the VPN client software.

The mechanics of "Source NAT" may be as follows: The source address and port of IP packets are modified with new values representing a unique public IP address/port pair which is routable back to the host. The old source address and port are statefully "remembered" by the host, so that return packets can have the reverse transformation applied, i.e. the original source address/port is reinstated.

When the packet object reaches the "Source NAT" stage, the ingress address is already present in the object because we tagged it above. Thereinafter, Source NAT transformation may be performed using the ingress address as the new packet source address.

Once the Source NAT transformation is complete, the tagged ingress address becomes the new Egress Address (i.e. the local IP address and port number of the interface on which the packet will be transmitted).

This has the effect that if a VPN client connects to ingress address "A" on the VPN server, all of their internet traffic (as visible to third-party internet entities) will appear to have originated from egress address "A".

In certain embodiments the ingress address is recorded in an object that represents a received network packet within the kernel network stack. Accordingly, this method may be effectuated using kernel-mode code in the operating system kernel. As the packet moves through the stack, the ingress address is tied to it, so after the VPN packet has been decrypted, the address is source transformed using the original ingress address before the packet is routed to its final destination.

This method described herein may be mostly of interest to VPN service providers because it allows for efficient management of ingress and egress IP address pools, and allows a user to take an IP address offline if it is the target of a distributed denial of service ("DDoS") attack without disrupting overall service availability.

The methods described herein may operate on other packet information besides source address. For example, and without limitation, the methods may be employed to swap TCP source and destination ports, change the IP and TCP header checksums, change the TCP sequence and acknowledgment numbers, and change IP addresses contained in the data payload.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

Certain embodiments may implement the techniques disclosed herein using a secure cookie protocol. For example, and without limitation a small piece of data sent from a website may be stored in a user's web browser while the user is browsing that website. Every time the user loads the website, the browser sends the cookie back to the server to notify the website of the user's previous activity. Cookies may be a reliable mechanism to remember stateful information.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims.

Accordingly, it is appropriate that the appended claims be construed broadly and in a manner consistent with the scope of the invention, as set forth in the following claims.

What is claimed:

1. A method including:
receiving, at a virtual private network (VPN) server, an encapsulated packet on an ingress address, said encapsulated packet having an original source address;
associating the ingress address with the encapsulated packet by storing the original source address and the ingress address in a structured data store;
transforming the original source address to the ingress address to effectuate a transformed packet;
routing the transformed packet to a remote destination;
receiving, at the ingress address, a response packet from the remote destination, and
transforming a destination address of the response packet to the original source address.

2. The method of claim 1 wherein the transforming includes one of either swapping TCP source and destination port information, changing an IP or TCP header checksum, changing a TCP sequence and acknowledgment number, or changing an IP addresses contained in the payload information.

3. The method of claim 1 wherein said storing is in either a database, lookup table, or an XML file.

4. The method of claim 1 further including tagging either the encapsulated packet or the transformed packet with a local IP address and a local port number on which the packet was received.

5. The method of claim 1 wherein the method is substantially performed in the kernel-mode code of an operating system kernel.

6. A processor-readable memory device including non-transitory processor-readable instructions directing one or more processors to effectuate a method including:
receiving, at a virtual private network (VPN) server, an encapsulated packet on an ingress address, said encapsulated packet having an original source address;
associating the ingress address with the encapsulated packet by storing the original source address and the ingress address in a structured data store;
transforming the original source address to the ingress address to effectuate a transformed packet;
routing the transformed packet to a remote destination;
receiving, at the ingress address, a response packet from the remote destination, and
transforming a destination address of the response packet to the original source address.

7. The device of claim 6 wherein the transforming includes one of either swapping TCP source and destination port information, changing an IP or TCP header checksum, changing a TCP sequence and acknowledgment number, or changing an IP addresses contained in the payload information.

8. The device of claim 6 wherein said storing is in either a database, lookup table, or an XML file.

9. The device of claim 1 wherein the further includes tagging either the encapsulated packet or the transformed packet with a local IP address and a local port number on which the packet was received.

10. The device of claim 1 wherein the method is substantially performed in the kernel-mode code of an operating system kernel.

* * * * *